United States Patent
Long et al.

(10) Patent No.: US 11,464,250 B2
(45) Date of Patent: Oct. 11, 2022

(54) NATURAL COMPOUND SWEETENER AND PREPARATION METHOD THEREFOR

(71) Applicant: HUNAN HUACHENG BIOTECH INC., Changsha (CN)

(72) Inventors: Weian Long, Changsha (CN); Huaxue Huang, Beijing (CN)

(73) Assignee: HUNAN HUACHENG BIOTECH INC, Changsha (CN)

( * ) Notice: Subject to any disclaimer, the term of this patent is extended or adjusted under 35 U.S.C. 154(b) by 164 days.

(21) Appl. No.: 16/500,096

(22) PCT Filed: Jun. 15, 2017

(86) PCT No.: PCT/CN2017/088409
§ 371 (c)(1),
(2) Date: Oct. 1, 2019

(87) PCT Pub. No.: WO2018/149065
PCT Pub. Date: Aug. 23, 2018

(65) Prior Publication Data
US 2021/0177022 A1    Jun. 17, 2021

(30) Foreign Application Priority Data
Feb. 20, 2017  (CN) .......................... 201710088935.3

(51) Int. Cl.
*A23L 27/30*   (2016.01)
*A23L 5/20*    (2016.01)
(Continued)

(52) U.S. Cl.
CPC .............. *A23L 27/36* (2016.08); *A23B 7/005* (2013.01); *A23B 7/02* (2013.01); *A23F 3/423* (2013.01); *A23L 3/16* (2013.01); *A23L 3/40* (2013.01); *A23L 5/23* (2016.08); *A23L 5/273* (2016.08); *A23L 5/49* (2016.08); *A23L 27/31* (2016.08); *A23L 33/175* (2016.08); *A23L 33/22* (2016.08); *B01D 11/0288* (2013.01); *B01D 15/362* (2013.01); *B01D 15/363* (2013.01); *B01D 61/025* (2013.01); *B01D 61/027* (2013.01); *B01D 61/58* (2013.01); *B01D 69/02* (2013.01); *B01D 71/02* (2013.01); *A23V 2002/00* (2013.01); *B01D 2311/02* (2013.01); *B01D 2311/2626* (2013.01); *B01D 2311/2649* (2013.01); *B01D 2311/2692* (2013.01); *B01D 2325/02* (2013.01)

(58) Field of Classification Search
CPC . A23L 27/36; A23L 27/31; A23L 5/23; A23L 33/22; A23L 33/175; A23L 5/273; A23L 5/49; A23L 3/16; A23L 3/40; A23B 7/005; A23B 7/02; A23F 3/423; B01D 11/0288; B01D 15/362; B01D 15/363; B01D 61/025; B01D 61/027; A23V 2002/00
USPC ........................................ 426/548, 597, 615
See application file for complete search history.

*Primary Examiner* — Helen F Heggestad
(74) *Attorney, Agent, or Firm* — Platinum Intellectual Property LLP

(57) ABSTRACT

Disclosed is a natural compound sweetener, comprising mogroside V, rebaudioside A, natural tea theanine and dietary fibre. The method for preparing the sweetener comprises the steps of: (1) dissolution, filtration, concentration and sterilization: dissolving the mogroside V, rebaudioside A, natural tea theanine and dietary fibre in water, filtering, concentrating in a vacuum, and sterilizing to obtain a sterilized solution; and (2) paste-collection, drying and granulation: carrying out paste-collection on the sterilized solution obtained in the step (1), vacuum drying the collected liquid paste, and drying and then granulating the dry powder to obtain the sweetener.

3 Claims, 2 Drawing Sheets

(51) Int. Cl.
*A23L 33/22* (2016.01)
*A23L 33/175* (2016.01)
*A23L 5/49* (2016.01)
*A23B 7/005* (2006.01)
*A23B 7/02* (2006.01)
*A23F 3/42* (2006.01)
*A23L 3/16* (2006.01)
*A23L 3/40* (2006.01)
*B01D 11/02* (2006.01)
*B01D 15/36* (2006.01)
*B01D 61/02* (2006.01)
*B01D 61/58* (2006.01)
*B01D 69/02* (2006.01)
*B01D 71/02* (2006.01)

NATURAL COMPOUND SWEETENER AND PREPARATION METHOD THEREFOR

RELATED APPLICATIONS

This application is a United States National Stage Application filed Oct. 1, 2019, under 35 U.S.C 371 of PCT Patent Application Serial No. PCT/CN2017/088409, filed Jun. 15, 2017, which claims Chinese Patent Application Serial No. CN 201710088935.3, filed Feb. 20, 2017, the disclosure of all of which are hereby incorporated by reference in their entirety.

FIELD

The present disclosure relates to sweeteners and preparation methods therefor and particularly relates to a natural compound sweetener and a preparation method therefor.

BACKGROUND

Along with the progress of society and the strengthening of awareness of people to physical health, it is found that excessive eating of the saccharose and synthesized saccharides will cause great harm to human bodies. It is discovered by nutritional surveys that although sugar eating may not directly cause diabetes, long-term and extensive eating of sweets will cause hypersecretion of insulin, metabolic disturbance of carbohydrates and fats and human body in-vivo environment disorder and then arise a variety of chronic diseases such as cardiovascular and cerebrovascular diseases, diabetes, obesity, senile cataract and dental caries. Therefore, sugarless, low-caloricity and purely-natural sweeteners are becoming the trend of our times and also have very huge market potential.

Mogroside V is also called *momordica* glycosides (or *Fructus momordicae* sweet), is purified from special economic plants, i.e., *Fructus momordicae* of Guangxi and Hunan districts and has the maximum sweetness of 420 times that of saccharose, but the caloricity of the mogroside V is 0. The *Fructus momordicae* is a medicinal and edible dual-purpose plant, has the effects of clearing heat, moistening the lung, arresting cough, moistening the intestines and relaxing the bowels and plays roles in preventing and treating obesity, constipation, diabetes, etc. The mogroside V is safe and non-toxic as foods and can be eaten at ease, however, tongues and mouths have a sweet aftertaste in a very long time after eating, part of aftertastes are accompanied with a bitter taste and an astringent taste, the sweet taste is not as comfortable and direct as that of saccharose, and people suffer from an unpleasant eating experience, thus, even if the mogroside V has sweetness of multiple times that of the saccharose, the application of the mogroside V as a substitute of the saccharose in daily lives as a sweetener is greatly affected by the aftertastes of the mogroside V, and the mogroside V can only be applied to the foods as additives by a few. Therefore, it is urgent to look for a scientific and reasonable sweetener composition to modify and cover the aftertastes of the mogroside and increase other actions to extend the range of application of the mogroside V.

A method for using rebaudioside C as a flavoring agent is disclosed by CN104144605A, namely the sweet taste of *Fructus momordicae* or *Fructus momordicae* combined with one or more of steviol glycoside-based glycosides or Rebaudioside A is enhanced by using one or more rebaudioside C polymorphic forms or stereoisomers thereof. The method for enhancing the sweet taste of the flavoring agent comprises the step of applying at least one combination of rebaudioside C (Reb C) polymorphic forms or stereoisomers thereof and *Fructus momordicae* or *Fructus momordicae* and steviol glycosides or *Fructus momordicae* and rebaudioside A flavoring agent to an object.

Wherein, the Reb C has sweetness of 300 times that of saccharose and can provide a sweet taste strengthening effect, although other off flavors are not increased, original Chinese herbal medicine taste and metal taste of stevioside are present and bring an unpleasant feeling to people, and the sweet aftertaste of *Fructus momordicae* is not modified.

A sweetener for preventing and treating deficiency-fire toothache is disclosed by CN105996026A. The sweetener comprises the raw materials in parts by weight: 5-7 parts of glycyrrhizin, 2-4 parts of mogroside, 3-5 parts of fructo-oligosaccharides, 2-4 parts of maltitol, 70-80 parts of rebaudioside A, 10-15 parts of stevioside, 6-8 parts of thaumatin and 20-30 parts of a traditional Chinese medicine extract, wherein the traditional Chinese medicine extract comprises the raw materials in parts by weight: 5-7 parts of *Rhizoma anemarrhenae*, 4-6 parts of raw rehmannia roots, 3-5 parts of root-barks of peony, 9-12 parts of *radix isatidis*, 6-8 parts of Chinese yams, 3-5 parts of *rhizoma polygonati*, 4-6 parts of prepared rehmannia roots, 2-4 parts of glossy *ganoderma*, 1-3 parts of *radix angelicae sinensis*, 2-4 parts of *radix achyranthis bidentatae*, 1-3 parts of *Rhizoma cyperi*, 1-2 parts of dried orange peel, 1-2 parts of *cortex albiziae* and 1-2 parts of *radix polygalae*. The sweetener employs a plenty of traditional Chinese medicine extracts, wherein the *rhizoma anemarrhenae*, the raw rehmannia roots, the *radix angelicae sinensis*, the *rhizoma cyperi* and the dried orange peel all have special fragrance ingredients, the mixed compound is mainly a traditional Chinese medicine compound, and the added sweetener is mainly used for regulating the taste of the traditional Chinese medicine compound, non-uniform of the sweet taste and conflict of all kinds of fragrances.

A consumable, a sweet consumable comprising some sweeteners and at least one sweet taste strengthening agent of which a concentration is close to sweetness detecting limit and a method for forming the sweet consumable are disclosed by CN101528059A. The sweeteners comprise saccharose, fructose, glucose, high-fructose corn syrup, corn syrup, xylose, arabinose, rhamnose, erythritol, xylitol, mannitol, sorbitol, inositol, acesulfame-K, aspartame, neotame, sucralose, saccharin or a combination thereof. The sweet taste strengthening agent is selected from naringin dihydrochalcone, mogroside V, a *Fructus momordicae* extract, rubusoside, a sweet tea extract, steviolbioside and stevioside. However, the formula has disadvantages as follows: (1) the saccharose is mainly dominated, other sweeteners are auxiliary, an effect of improvement on the taste of the composition is not concerned, and modification and cover of adverse aftertastes of high-power sweeteners are not concerned; (2) a variety of synthesized additives are contained, and thus, concealed worry about edible safety of customers is present; and (3) the formula is complicated, the processing process is complicated, the sweet taste is not uniform, and all kinds of fragrances are conflicted.

A neostevioside-mogroside V mixture is disclosed by CN103402374A and comprises mogroside V and a neostevioside ingredient, of which a weight ratio is ≥1:1 and ≤6:1, wherein the neostevioside ingredient consists of one or more compounds selected from neostevioside A, neostevioside B and neostevioside D. According to the formula, natural products, i.e., the mogroside V and the neostevioside are selected for compounding, although the bitter aftertaste of the neostevioside is postponed by using the mogroside, the combination of the two kinds of sweeteners cannot perform modification and cover on respective sweet aftertastes, astringent aftertastes, adverse aftertastes and metal tastes.

A novel edible sugar substitute capable of being applied to foods and health products is disclosed by CN105639258A and comprises the raw materials in percentage by mass: 99%-99.97% of erythritol, 0.01%-0.5% of mogroside and 0.005%-0.03% of neotame, and the edible sugar substitute is prepared through compounding the above-mentioned raw materials at normal temperature. However, the sugar substitute contains an artificial sweetener, i.e., neotame, the sweetness and sweet feeling of the novel edible sugar substitute are not disclosed, and sweet aftertastes and other adverse aftertastes of the mogroside and the neotame are hardly covered by pure utilization of the erythritol; and in addition, a preparation method for the novel edible sugar substitute comprises the step of only simply mixing the raw materials, so that the problems that the amount of high-power sweet is very small, the prepared product is poor in uniformity and stability, and easy in layering and non-uniform in sweet feeling are caused.

SUMMARY

A technical problem to be solved by the present disclosure is to overcome the above-mentioned defects in the prior art and provide a natural compound sweetener, which is prepared from natural plant products, is good in compound taste, pure and soft in sweetness, pleasant in fragrance, good in product uniformity and stability, natural and safe and free of toxic or side effects.

A technical problem to be further solved by the present disclosure is to overcome the above-mentioned defects in the prior art and provide a preparation method for the natural compound sweetener, which is simple in technological process and suitable for large-scale production.

A technical scheme for solving the technical problems employed by the present disclosure is as follows: a natural compound sweetener comprises mogroside V, rebaudioside A, natural tea theanine and dietary fibre.

According to the present disclosure, the selected natural tea theanine has a sedative effect, can protect nerve cells, can be used to prevent and treat diseases such as cerebral embolism, cerebral hemorrhage, cerebral apoplexy, cerebral ischemia and senile dementia, can enhance memory, and can further improve addition actions of the compound sweetener, sweet aftertaste time of the mogroside V is shortened by natural and pure fresh-brisk taste and sweet taste of the natural tea theanine, the natural tea theanine has covering and effect abating actions on after-astringency and bitterness of the rebaudioside A, and no off flavor can be increased; and the dietary fibre is free of any adverse off flavor, the degree of saturation of the compound sweetener is increased due to natural delicate fragrance of the dietary fibre, the compound sweetener can be softer, brisker and more natural in flavor, a cool and refreshing feeling after eating is prolonged, and adverse aftertastes of the mogroside V and the rebaudioside A can be excellently modified and covered through a synergetic effect between the dietary fibre and the natural tea theanine.

Preferably, the compound sweetener comprises the raw materials in parts by weight: 0.5-10.0 parts of mogroside V, 1-10 parts of rebaudioside A, 0.1-2.0 parts (more preferably 0.2-1.0 part) of natural tea theanine and 60-90 parts (more preferably 65-80 parts) of dietary fibre. The brisk, cool and refreshing taste of the sweetener will be affected if the consumption of any one of the mogroside V, rebaudioside A or natural tea theanine in the compound sweetener is too high or low.

Preferably, the mogroside V has a purity of 20%-52%.
Preferably, the rebaudioside A has a purity of 95%-99%.
Preferably, the natural tea theanine has a purity of 10%-30%.

Preferably, the dietary fibre has a purity of 40%-90% (more preferably 45%-55%) in terms of pectin. The dietary fibre preferably is water-soluble *Fructus momordicae* dietary fibre.

Preferably, a preparation process for the mogroside V comprises the steps of extraction, membrane separation, decoloring, concentration, sterilization, paste-collection and drying. Specifically, firstly, crushing *Fructus momordicae* with a crusher, then, subjecting the crushed *Fructus momordicae* to extraction for 2 or more times with boiling water, of which the weight is 1-2 times that of the crushed *Fructus momordicae*, then, performing separation by a nanofiltration membrane with a molecular weight of 20,000 D to 40,000 D, decoloring trapped fluid by adopting cation resin and anion resin, concentrating the decolored trapped fluid with a reverse osmosis membrane at a temperature of 20° C.-25° C. under a pressure of 1.5 MPa until Brix is 15-20, performing sterilization at a temperature of 120° C.-125° C. at a frequency of 50 Hz to collect a sterilized solution, performing paste-collection by employing vacuum concentration until Brix is 65-70, and subjecting the collected liquid paste to vacuum drying at a temperature of 50° C.-70° C. under a pressure of −0.095 MPa, thereby preparing the mogroside V. Compared with extraction, macroporous resin adsorption, ethanol analysis, decoloring, vacuum concentration, sterilization and drying in the traditional process, the production process is completely different, only water is used as a solvent in a whole process, and the mogroside V is good in taste, safe and free of toxic or side effects.

Preferably, a preparation process for the natural tea theanine comprises the steps of tea leaf crushing, room temperature extraction, membrane separation, concentration, sterilization and drying. Specifically, crushing the tea leaves to 20-40-mesh, subjecting the crushed tea leaves to extraction for 2 or more times with water, of which the weight is 2 to 4 times that of the crushed tea leaves, at room temperature, in a manner of performing extraction for 20 to 40 minutes at a time to obtain an extract, strictly filtering the extract, then, performing separation by a nanofiltration membrane with the molecular weight of 6,000 D to 10,000 D to obtain trapped fluid, subjecting the trapped fluid to vacuum concentration until Brix is 30-35, performing sterilization at a temperature of 120° C.-125° C. at a frequency of 50 Hz, and subjecting the sterilized solution to vacuum drying at a temperature of 50° C.-70° C. under a pressure of −0.095 MPa, thereby obtaining the natural tea theanine.

In the present disclosure, the mogroside V is selected from one or more of mogroside V, a mogroside V concentrate and a *Fructus momordicae* extract containing the mogroside V, preferably selected from one or more of the *Fructus momordicae* extract containing the mogroside V, or the mogroside V concentrate, and more preferably the mogroside V concentrate.

In the present disclosure, the mogroside V has a purity of 20 wt %-52 wt %, namely based on the total weight of the mogroside V, the *Fructus momordicae* extract containing the mogroside V, or the mogroside V concentrate, in terms of the weight of the mogroside V, wherein the weight percent of the mogroside V is 20 wt %-52 wt %.

In one preferred embodiment of the present disclosure, a preparation process for the mogroside V comprises the steps:

(1-1) extraction: crushing *Fructus momordicae* with a crusher (using broken shells, fruit peel and pulp together), then, subjecting the crushed *Fructus momordicae* to extraction for 2-4 times with boiling water, of which the weight is 1-2 times that of the crushed *fructus momordicae*, wherein preferably continuous heating is performed during extraction to enable a system to keep at a temperature of 80° C.-90° C., and the extraction time is 2 hours at a time;

(1-2) membrane separation: performing separation by a nanofiltration membrane with a molecular weight of 20,000 D to 40,000 D;

(1-3) decoloring: decoloring the nanofiltration trapped fluid obtained in the step 1-2 by adopting anion resin and cation resin sequentially, wherein the weight of the resin is 0.2-1 times that of fresh *Fructus momordicae*, the cation resin preferably is cation resin 732, the anion resin preferably is anion resin 717, and decoloring is carried out at a flow velocity of 0.5 bv/h to 2 bv/h;

(1-4) concentration: concentrating the decolored trapped fluid with a reverse osmosis membrane at a temperature of 20° C.-25° C. under a pressure of 1.5 MPa until Brix is 15-20 (the solid content is 15%-20%);

(1-5) sterilization: performing sterilization for 10-30 min at a temperature of 120° C.-125° C. at a frequency of 50 Hz to collect a sterilized solution;

(1-6) paste-collection: performing paste-collection by employing vacuum concentration until Brix is 65-70 (the solid content is 65%-70%); and (1-7) drying: subjecting the collected liquid paste to vacuum drying at a temperature of 50° C.-70° C. under a pressure of −0.095 MPa.

In one preferred embodiment of the present disclosure, the mogroside V concentrate is prepared by a method comprising the steps as follows:

Step 2-1: firstly, crushing *Fructus momordicae* with a crusher, and then, subjecting the crushed *Fructus momordicae* to extraction for 2 or more times with boiling water, of which the weight is 1-2 times that of the crushed *Fructus momordicae*;

Step 2-2: then, performing separation by a nanofiltration membrane with a molecular weight of 20,000 D to 40,000 D;

Step 2-3: decoloring trapped fluid by adopting anion resin and cation resin, wherein the weight of the resin is 0.2-1 times that of fresh *Fructus momordicae*, the cation resin preferably is cation resin 732, the anion resin preferably is anion resin 717, and decoloring is carried out at a flow velocity of 0.5 bv/h to 2 bv/h;

Step 2-4: concentrating the decolored trapped fluid with a reverse osmosis membrane at a temperature of 20° C.-25° C. under a pressure of 1.5 MPa until Brix is 15-20 (the solid content is 15%-20%), and performing sterilization at a temperature of 120° C.-125° C. at a frequency of 50 Hz to collect a sterilized solution; and Step 2-5: performing paste-collection by employing vacuum concentration until Brix is 65-70 (the solid content is 65%-70%), thereby obtaining the mogroside V concentrate.

In the present disclosure, the *Fructus momordicae* extract containing the mogroside V is obtained through subjecting the mogroside V concentrate to vacuum drying at a temperature of 50° C.-70° C. under a pressure of −0.095 MPa.

In the present disclosure, impurities contained in the mogroside V concentrate and the *Fructus momordicae* extract containing the mogroside V are mainly polysaccharides such as starch; and the inventors discover that the impurities have a taste harmonizing action, and through a synergetic effect among the impurities, the natural tea theanine, the dietary fibre, etc., the sweetener can be rapid in sweet taste and be tasty and cool.

In the present disclosure, the rebaudioside A has a purity of 95%-99%; and the inventors discover that the higher the content of the rebaudioside A, the higher the sweetness, the better the taste of the prepared natural compound sweetener.

In the present disclosure, the rebaudioside A is prepared from *Stevia rebaudiana*; and in compound flavorings, through a synergetic effect between the rebaudioside A and other ingredients, the sweetness can be improved, and the duration of a sweet taste is prolonged.

In one preferred embodiment of the present disclosure, the rebaudioside A is purchased from Jiangxi Haifu Bio-Engineering Co., Ltd.

In another preferred embodiment of the present disclosure, the rebaudioside A is prepared by the following method comprising the steps:

Step 3-1: soaking the *Stevia rebaudiana* with hot water, of which the weight is 15-20 times that of dry *Stevia rebaudiana* dried leaves, performing extraction for 3 times at an extraction temperature of 50° C.-70° C. in a manner of performing extraction for 1 hour at a time, and performing filtering to obtain an extract;

Step 3-2: adding a saturated solution of ferric chloride into the extract, and adjusting a pH value to 5;

Step 3-3: then, adding lime cream, adjusting the pH value to 9, performing flocculation for 2-6 hours, and performing filtering to obtain flocculation filter liquor;

Step 3-4: enabling the flocculation filter liquor to pass through macroporous adsorption resin D101, wherein the consumption of the resin is 0.5-1 times the weight of the *Stevia rebaudiana* feedstock, and the flow velocity is 0.5-1 bv/h;

Step 3-5: performing desorption with 2 bv-3 bv of 60%-70% (volume percent) ethanol to obtain desorbed liquid;

Step 3-6: decoloring the desorbed liquid sequentially with cation resins of 732, etc. and anion resin of 717, etc., of which the weight is 0.1-0.5 times that of the *Stevia rebaudiana* feedstock, to obtain decolored liquid, wherein the flow velocity is 0.5-2 bv/h;

Step 3-7: subjecting the decolored liquid to reduced-pressure concentration at a temperature of 70° C.-80° C. at a degree of vacuum of −0.08 MPa until Brix is 40-55 (the solid content is 40%-55%) to obtain a concentrate;

Step 3-8: subjecting the concentrate to vacuum drying at a temperature of 50° C.-70° C. under a pressure of −0.095 MPa to obtain a stevioside crude product; and Step 3-9: subjecting the stevioside crude product to heated dissolving with ethanol, of which the weight is 2-10 times that of the stevioside crude product, performing filtering, performing cooling to room temperature, performing crystallizing for 12-24 hours, and performing filtering and drying to obtain refined rebaudioside A, wherein the ethanol has a volume percent of 50%-95%, and a dissolving temperature is 40° C.-70° C.

Optionally, other ingredients are separated from filtered crystallizing mother liquor obtained in the step 3-9.

In the present disclosure, the natural tea theanine comes from tea leaves of a green tea variety, preferably leaf blades and/or leaf stalks of the tea leaves of the green tea variety picked in March to July, more preferably leaf blades of the tea leaves of the green tea variety picked in April to June.

The inventors discover that the content of theanine in the tea leaves of green tea is rich, and the feedstock is low in cost and wide in source, so that the tea leaves of the green tea are selected as feedstocks of the theanine.

In the present disclosure, the natural tea theanine has a purity of 10%-30%.

The inventors discover that a major impurity in the natural tea theanine is tea polyphenol which has the action of eliminating off flavors; and through a synergetic effect among the tea polyphenol, the natural tea theanine, the dietary fibre, etc., adverse flavors are covered, and the taste can be pleasant.

In one preferred embodiment of the present disclosure, the natural tea theanine is prepared by a method comprising the steps as follows:

Step 4-1: crushing the tea leaves to 20-40-mesh, subjecting the crushed tea leaves to extraction for 2 or more times with water, of which the weight is 2 to 4 times that of the crushed tea leaves, at room temperature, in a manner of performing extraction for 20 to 40 minutes at a time to obtain an extract;

Step 4-2: strictly filtering the extract, and then, performing separation by a nanofiltration membrane with the molecular weight of 6,000 D to 10,000 D to collect trapped fluid;

Step 4-3: subjecting the trapped fluid to vacuum concentration until Brix is 30-35 (the solid content is 30%-35%), and performing sterilization at a temperature of 120° C.-125° C. at a frequency of 50 Hz; and Step 4-4: subjecting the sterilized solution to vacuum drying at a temperature of 50° C.-70° C. under a pressure of −0.095 MPa, thereby obtaining the natural tea theanine.

In the present disclosure, the dietary fibre is selected from one or more of *fructus momordicae* dietary fibres and inulin, preferably one or more of the *Fructus momordicae* dietary fibres.

The inventors discover that major impurities in the dietary fibre are polysaccharides such as starch, the impurities in the dietary fibre have a moisture absorption preventing action, and the stability of the natural compound sweetener can be improved through a synergetic effect among the impurities, the natural tea theanine, the dietary fibre, etc.

In one preferred embodiment of the present disclosure, the water-soluble *fructus momordicae* dietary fibre is prepared by a method comprising the steps as follows:

Step 5-1: taking *Fructus momordicae* fruit residues, obtained after the mogroside V is extracted, adding 3%-5% (mass concentration) of diluted hydrochloric acid, of which the weight is 1-2 times that of the taken *Fructus momordicae* fruit residues, into the taken *fructus momordicae* fruit residues, performing heating to 80° C.-90° C., and performing extraction for 2 or more times in a manner of performing extraction for 2 hours at a time;

Step 5-2: performing filtering to obtain an acid extract;

Step 5-3: adjusting a pH value to be neutral with 5%-10% (mass concentration) of sodium hydroxide to obtain neutralized liquid;

Step 5-4: decoloring the neutralized liquid with cation resins of 732, etc. and anion resin of 717, etc., of which the weight is 0.2-1 times that of the fruit residues, to obtain decolored liquid, wherein the flow velocity is 0.5-2 bv/h;

Step 5-5: concentrating the decolored liquid with a reverse osmosis membrane at a temperature of 20° C.-25° C. under a pressure of 1.5 MPa until Brix is 15-20 (the solid content is 15%-20%), and performing sterilization at a temperature of 120° C.-125° C. at a frequency of 50 Hz to collect a sterilized solution;

Step 5-6: performing paste-collection by employing vacuum concentration until Brix is 65-70 (the solid content is 65%-70%) to obtain a water-soluble *Fructus momordicae* dietary fibre concentrate; and Step 5-7: subjecting the concentrate to vacuum drying at a temperature of 50° C.-70° C. under a pressure of −0.095 MPa, thereby obtaining the water-soluble *Fructus momordicae* dietary fibre.

In one preferred embodiment of the present disclosure, the compound sweetener comprises the raw materials in parts by weight: 0.5-10.0 parts of mogroside V, 1-10 parts of rebaudioside A, 0.1-2.0 parts (more preferably 0.2-1.0 part) of natural tea theanine and 60-90 parts (more preferably 65-80 parts) of dietary fibre.

In one preferred embodiment of the present disclosure, the compound sweetener comprises the following ingredients in parts by weight:

Mogroside V 0.5-10.0 parts by weight,
Rebaudioside A 1-10 parts by weight,
Natural tea theanine 0.1-2.0 parts by weight, and
Dietary fibre 60-90 parts by weight,
Preferably,
Mogroside V 2.0-8.0 parts by weight,
Rebaudioside A 3-8 parts by weight,
Natural tea theanine 0.5-1.5 parts by weight, and
Dietary fibre 70-80 parts by weight.

It is discovered in the present disclosure that the brisk, cool and refreshing taste of the sweetener will be affected if the consumption of any one of the mogroside V, rebaudioside A or natural tea theanine in the compound sweetener is too high or low.

It is discovered in the present disclosure that relatively high cost will be caused if the consumption of the mogroside V is too high, and an unpleasant taste cannot be covered if the consumption of the mogroside V is too low.

It is discovered in the present disclosure that obvious bitter aftertaste will be caused if the consumption of the rebaudioside A is too high, and the sweetness is insufficient if the consumption of the rebaudioside A is too low.

It is discovered in the present disclosure that obvious tea bitter taste will be caused if the consumption of the natural tea theanine is too high, and the compound sweetener is free of a faint-scent and cool taste if the consumption of the natural tea theanine is too low.

It is discovered in the present disclosure that the compound sweetener is prone to moisture absorption and is unstable if the consumption of the dietary fibre is too high, and the cost is relatively high if the consumption of the dietary fibre is too low.

In the present disclosure, the natural compound sweetener further comprises one or more of a mogroside composition and a stevioside composition, wherein, The mogroside composition comprises mogroside III, mogroside IV and mogroside VI;

The stevioside composition comprises stevioside ST, stevioside RC and stevioside RD.

In one preferred embodiment of the present disclosure, the mogroside composition comprises the following ingredients in parts by weight:

Mogroside III 0.1-2.0 parts by weight,
Mogroside IV 0.1-2.0 parts by weight, and
Mogroside VI 0.1-2.0 parts by weight;
Preferably,
Mogroside III 0.5-1.0 part by weight,
Mogroside IV 0.5-1.0 part by weight, and
Mogroside VI 0.5-1.0 part by weight.

In another preferred embodiment of the present disclosure, the stevioside composition comprises the following ingredients in parts by weight:
Stevioside ST 0.2-2.0 parts by weight,
Stevioside RC 0.1-1.0 part by weight, and
Stevioside RD 0.1-1.0 part by weight;
Preferably,
Stevioside ST 0.1-1.0 part by weight,
Stevioside RC 0.05-0.5 part by weight, and
Stevioside RD 0.05-0.5 part by weight.

In the present disclosure, the mogroside V plays roles in improving solubility of the compound sweetener and increasing a dissolving speed of the compound sweetener.

In the present disclosure, the rebaudioside A plays roles in prolonging sweet taste duration and improving sweetness.

In the present disclosure, the mogroside V and the rebaudioside A are in a synergetic effect, the sweetness is improved, a bitter aftertaste of the mogroside V is covered, and an unpleasant taste of the sweetener is eliminated.

In the present disclosure, the mogroside composition plays a role in improving a flavor, and thus, a taste of the natural compound sweetener can be closer to that of saccharose.

In the present disclosure, the cost of the mogroside composition is lower than that of other sweeteners, and the mogroside composition, the mogroside V and the rebaudioside A are in a synergetic effect, so that the sweetness of the natural compound sweetener is improved, and thus, the cost is reduced.

In the present disclosure, the stevioside composition is not prone to moisture absorption, so that the composition not only can be used for improving the sweetness of the natural compound sweetener, but also can be used for preventing moisture absorption.

In the present disclosure, the stevioside composition, the mogroside V and the rebaudioside A are in a synergetic effect, and thus, the stability of the compound sweetener can be improved.

More preferably, the compound sweetener further comprises the following ingredients in parts by weight:
Mogroside composition 0.5-5 parts by weight, and
Stevioside composition 1-10 parts by weight.

Further preferably, the compound sweetener comprises the following ingredients in parts by weight:
Mogroside V 2.0-8.0 parts by weight,
Rebaudioside A 3-8 parts by weight,
Natural tea theanine 0.5-1.5 parts by weight,
Dietary fibre 70-80 parts by weight,
Mogroside composition 1-2 parts by weight, and
Stevioside composition 2-3 parts by weight.

In the present disclosure, the mogroside composition is prepared by a method comprising the steps as follows:

Step 6-1: taking a *Fructus momordicae* extract (wherein, the content of the mogroside V is 25%-50%), adding 50%-90% (volume percent) of ethanol, of which the weight is 5-20 times that of the taken *Fructus momordicae* extract, into the taken *Fructus momordicae* extract, and performing heating dissolving;

Step 6-2: subjecting the ethanol solution to reduced-pressure concentration at a temperature of 70° C.-80° C. at a degree of vacuum of −0.08 MPa until a volume is 1/5-1/20 the original volume to obtain a concentrate;

Step 6-3: subjecting the concentrate to freezing crystallizing in a cold storage for 24-48 hours at a crystallizing temperature of −5° C.-5° C.; and Step 6-4: performing filtering, drying a filter cake to obtain high-content mogroside V, and subjecting the filter cake to vacuum drying at a temperature of 50° C.-70° C. under a pressure of −0.095 MPa, thereby obtaining the mogroside composition.

In the present disclosure, the stevioside composition is prepared from a rebaudioside A crystallizing mother liquor feedstock; and in compound flavorings, the stevioside composition plays roles in improving sweetness and preventing moisture absorption and is in synergism with other ingredients, and thus, the stability of the compound sweetener can be improved.

In the present disclosure, the stevioside composition is prepared by a method comprising the steps as follows:

Step 7-1: subjecting the rebaudioside A crystallizing mother liquor to reduced-pressure concentration at a temperature of 70° C.-80° C. at a degree of vacuum of −0.08 MPa to cleanly volatilize water and solvents from the rebaudioside A crystallizing mother liquor, and performing baking to obtain stevioside mother liquor saccharides;

Step 7-2: adding anhydrous ethyl alcohol, of which the weight is 5-10 times that of the mother liquor saccharides, into the stevioside mother liquor saccharides, performing heating to 50° C.-60° C., and performing stirring for 30-60 min to fully dissolve the mother liquor saccharides;

Step 7-3: subjecting the ethanol solution to freezing crystallizing in a cold storage for 24-48 hours at a crystallizing temperature of −5° C.-5° C.; and Step 7-4: performing filtering, and subjecting the filter cake to vacuum drying at a temperature of 50° C.-70° C. under a pressure of −0.095 MPa, thereby obtaining the stevioside composition.

A technical scheme for further solving the technical problems employed by the present disclosure is as follows: a preparation method for the natural compound sweetener comprises the following steps:

(8-1) dissolution, filtration, concentration and sterilization: dissolving the mogroside V, rebaudioside A, natural tea theanine and dietary fibre in water, filtering, concentrating in a vacuum, and sterilizing to obtain a sterilized solution; and (8-2) paste-collection, drying and granulation: carrying out paste-collection on the sterilized solution obtained in the step (8-1), vacuum drying the collected liquid paste, and drying and then granulating the dry powder to obtain the sweetener.

According to the method provided by the present disclosure, through a water dissolving process, all feedstock ingredients can be sufficiently dissolved and mixed and interact; and through a great deal of composition formula tests, all the feedstock ingredients generate synergism, covering, modification, efficiency-increasing and efficiency-decreasing actions, subtle changes occur among all the feedstock ingredients, the property advantages among all the ingredients are exerted to the maximum, an unexpected effect on covering and modifying adverse aftertastes of the mogroside V and the rebaudioside A is achieved, and other adverse flavors and odors are absent.

Preferably, in the step (8-1), the amount of water for dissolving is 15-20 times the total weight of all the raw materials.

Preferably, in the step (8-1), filtration employs a ceramic membrane with a pore size of 0.2-1.0 micron (more preferably 0.25 micron). Through ceramic membrane filtration, foreign impurities of the raw materials or generated from production, foreign matters and a few of precipitates generated from reactions among all the other raw materials can be excellently filtered off, so that the compound sweetener can be purer in taste, better in uniformity and more stable in property.

Preferably, in the step (8-1), the vacuum concentration is performed at a temperature of 45° C.-55° C. under a pressure of −0.080 MPa to −0.095 MPa until the solid content is 30%-40%.

Preferably, in the step (8-1), the sterilization is performed at a temperature of 120° C.-125° C. at a frequency of 40 Hz to 60 Hz.

Preferably, in the step (8-2), the solid content of a material obtained after paste-collection is 50%-70%.

Preferably, in the step (8-2), the vacuum drying is performed at a temperature of 25° C.-55° C. under a pressure of −0.090 MPa to −0.095 MPa until the moisture content is not higher than 5%. Preferably, the vacuum drying employs a continuous low-temperature vacuum belt drier.

In the step (8-1), the amount of water for dissolving is 18 times the total weight of all the raw materials, all ingredients in the raw materials can be thoroughly dissolved, and an obtained liquid mixture is proper in concentration; all the ingredients can be sufficiently mixed uniformly, meanwhile, paste-collection is also facilitated, and energy is saved, so that all the ingredients in the natural compound sweetener can be sufficiently dissolved.

In the step (8-1), a dissolving temperature is 40° C.-90° C., preferably 50° C.-80° C. The inventors discover that by dissolving the raw materials at the temperature of 40° C.-90° C., the raw materials can be rapidly and thoroughly dissolved, and ingredients in the raw materials can be kept undestroyed.

In the present disclosure, solvents employed are all water, the inventors discover that it is the safest to use water, superstandard solvent residual in the product will be caused by using the solvents except for water, and production requirements on food additives are not met.

In the step (8-1), the solid content after concentration is 30%-40% to remove moisture from an extract.

In the present disclosure, sterilization is required when a higher concentration is concentrated, and a dried solid cannot be sufficiently sterilized; and after the product is directly concentrated until the product is dried, the product is hard to take out of concentrating equipment, thus, the natural compound sweetener is obtained through twice drying in the step (8-1) and the step (8-2).

In the step (8-1), a sterilization method employed is microwave sterilization to kill microbes, and the colony number is in line with food additive standards of European Union after sterilization.

In the step (8-2), the drying is performed at a temperature of 25° C.-55° C. under a pressure of −0.090 MPa to −0.095 MPa until the moisture content of a final state is not higher than 5%, thus, transportation and storage are facilitated, and the quality of the natural compound sweetener is improved.

In the step (8-2), a paste-collection method is vacuum reduced-pressure concentration, the solid content after concentration is 50%-70% to remove surplus moisture, and thus, transportation, storage and drying are facilitated.

In the step (8-2), granules with a grain size of 0.5-1 mm and basic consistent shapes and specifications are obtained through granulating, and thus, packaging and use are facilitated.

The present disclosure has beneficial effects as follows:
(1) raw materials of the compound sweetener provided by the present disclosure belong to purely natural plant products; compared with independent use of the mogroside V, through matching the mogroside V and the rebaudioside A, the sweetness is improved, the cost is reduced greatly, and thus, the compound sweetener is suitable for being used by ordinary consumers; and the natural tea theanine and the dietary fibre added into the compound sweetener can interact with the mogroside V and the rebaudioside A, the action of the compound sweetener is improved, adverse aftertastes of the mogroside V and the rebaudioside A are modified and covered, the taste is pure, the sweetness is very similar to that of saccharose, the uniformity is good, and the properties are stable;

(2) the compound sweetener provided by the present disclosure has the characteristics of being low in calorie, purely natural, etc., and thus, gastrointestinal discomfort phenomena such as abdominal distension, borborygmus and diarrhea caused by excessive eating of general functional saccharides will not be caused by daily eating; the compound sweetener has a sedative effect, can protect neural cells, can be used to prevent and treat diseases such as cerebral embolism, cerebral hemorrhage, cerebral apoplexy, cerebral ischemia and senile dementia, has the actions of strengthening sleep, improving memory, etc. and can be used as a substitute of health foods, formulated foods for special medical use, other ordinary foods or common saccharoses; and the formula is scientific, novel and safe, the application is extensive, and the market prospect is particularly broad; and (3) the method provided by the present disclosure is simple and stable in production process, the sweetener is natural and safe, and the cost is close to that of the saccharose, so that the sweetener is suitable for being produced on a large scale.

DETAILED DESCRIPTION OF THE EMBODIMENTS

Figure 1:
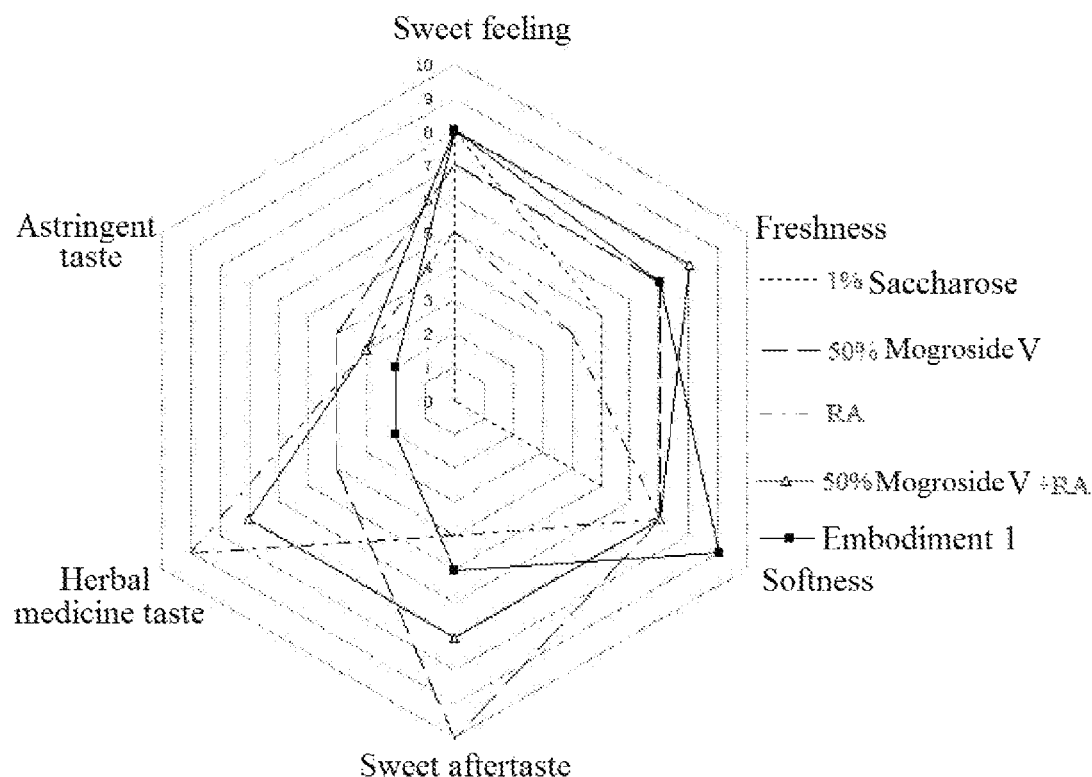
FIG. 1 is an electronic tongue tasting test data graph of a natural compound sweetener of embodiment 1 of the present disclosure.

The present disclosure is further described below with reference to embodiments.

Both rebaudioside A and dietary fibre employed in the embodiments of the present disclosure are purchased from Jiangxi Haifu Bio-Engineering Co., Ltd.; a ceramic membrane employed in the embodiments of the present disclosure has a model number of WTM-CM-02 and is purchased from Hangzhou WATECH; and food additives or materials employed in the embodiments of the present disclosure are all acquired through the conventional commercial ways except for particular descriptions.

Reference Example 1

A preparation process for mogroside V comprises the steps: picking 100 kg of fresh ripe *Fructus momordicae*, crushing the *Fructus momordicae* with a crusher (breaking shells), then, adding the crushed the *Fructus momordicae* into boiling water, performing extraction for 4 times (the mixture is heated to a temperature of 80° C.-90° C., the extraction time is 2 hours at a time, and the water consumption is 150 L at a time), collecting 610 L of extract in four times, performing strict filtering (namely, precise filtering to remove solids from the extract), then, performing separation with a nanofiltration membrane with a molecular weight of 30,000 D to collect trapped fluid, decoloring the collected trapped fluid sequentially through a chromatography column loaded with 10 L of resin 717 and a chromatography column loaded with 10 L of resin 732, concentrating 23.5 kg of decolored trapped fluid with a reverse osmosis membrane at a temperature of 25° C. under a pressure of 1.5 MPa until Brix is 17, then, performing sterilization for 20 min at a frequency of 50 Hz at a temperature of 122° C. to collect a sterilized solution, performing paste-collection by employing vacuum concentration until Brix is 68, and subjecting the collected liquid paste to vacuum drying at a temperature of 60° C. under a pressure of −0.095 MPa to finally obtain 0.92 kg of dry powder; proven by tests, the content of the mogroside V is 51.0%, and impurities are mainly polysaccharide substances.

Reference Example 2

A preparation process for natural tea theanine comprises the steps: picking 20 kg of leaf blades of tea leaves of a green tea variety of annual new spring tea picked in April to June. (the content of theanine in dry leaves is 2.3%), crushing the leaf blades to 20-40-mesh, performing extraction twice with water at room temperature, wherein extraction is performed for 30 min with 80 L of water in a first time, and extraction is performed for 30 min with 60 L of water in a second time, collecting 138 L of extract twice, strictly filtering, then, performing separation with a nanofiltration membrane with a molecular weight of 8,000 D, subjecting trapped fluid to vacuum concentration until Brix is 32, then, performing sterilization at a frequency of 50 Hz at a temperature of 122° C., and subjecting the sterilized solution to vacuum drying at a temperature of 60° C. under a pressure of −0.095 MPa to finally obtain 1.98 kg of dry powder; proven by tests, the content of the theanine is 21.4%, and impurities are mainly tea polyphenol substances.

Reference Example 3

80 kg (wet weight) of *Fructus momordicae* fruit residues, obtained after the mogroside V is extracted, are taken, 120 kg of 3% diluted hydrochloric acid is added, heating to a temperature of 80° C. is performed, extraction is performed for 3 times in a manner of performing extraction for 2 hours at a time, and filtering is performed to obtain an acid extract. A pH value is adjusted with 10% (mass concentration) of sodium hydroxide to be neutral to obtain neutralized liquid. The neutralized liquid is decolored with 40 kg of cation resins of 732, etc. and 40 kg of anion resins of 717, etc. to obtain decolored liquid, wherein the flow velocity is 1 bv/h. The decolored liquid is concentrated with a reverse osmosis membrane at a temperature of 25° C. under a pressure of 1.5 MPa until Brix is 20, and sterilization is performed for 20 min at a frequency of 50 Hz at a temperature of 120° C. to collect a sterilized solution; paste-collection is performed by employing vacuum concentration until Brix is 65 to obtain a water-soluble *fructus momordicae* dietary fibre concentrate; and the concentrate is subjected to vacuum drying at a temperature of 60° C. under a pressure of −0.095 MPa, thereby obtaining 11.6 kg of the water-soluble *Fructus momordicae* dietary fibre. Proven by tests, the content of water-soluble dietary fibre is 51% (in terms of pectin).

Reference Example 4

100 kg of *Stevia rebaudiana* (the content of rebaudioside A in dry leaves is 10.8%) are soaked with 1500 kg of hot water, extraction is performed for 3 times at an extraction temperature of 60° C. in a manner of performing extraction for 1 hour at a time, and filtering is performed to obtain an extract. A saturated solution of ferric chloride is added into the extract, and a pH value is adjusted to 5. Then, lime cream is added, the pH value is adjusted to 9, flocculation is performed for 5 hours, and filtering is performed to obtain flocculation filter liquor. The flocculation filter liquor is enabled to pass through macroporous adsorption resin of D101, etc., wherein the consumption of the resin is 50 kg, and the flow velocity is 1 bv/h. Desorption is performed with 2.5 bv of 60% (volume percent) ethanol to obtain desorbed liquid. The desorbed liquid is decolored with 20 kg of cation resin 732 and 20 kg of anion resin 717 sequentially to obtain decolored liquid, wherein the flow velocity is 1 bv/h. The decolored liquid is subjected to reduced-pressure concentration at a temperature of 80° C. at a degree of vacuum of −0.08 MPa until Brix is 50 to obtain a concentrate. The concentrate is subjected to vacuum drying at a temperature of 70° C. under a pressure of −0.095 MPa to obtain a stevioside crude product. Proven by tests, the content of the rebaudioside A in the stevioside crude product is 65.2%. The stevioside crude product is subjected to heated dissolving with ethanol, of which the weight is 8 times that of the stevioside crude product, performing filtering, performing cooling to room temperature, performing crystallizing for 24 hours, and performing filtering and drying to obtain 9.9 kg of refined rebaudioside A, wherein the ethanol has a volume percent of 85%, and a dissolving temperature is 50° C.; proven by tests, the content of the rebaudioside A is 98.3%.

Reference Example 5

50 kg of *Fructus momordicae* extract (wherein, the content of the mogroside V is 50%) is taken, 500 kg of 60% (volume percent) ethanol is added, and heating dissolving is performed. The ethanol solution is subjected to reduced-pressure concentration at a temperature of 75° C. at a degree of vacuum of −0.08 MPa until a volume is 1/10 the original volume to obtain about 110 kg of concentrate; the concentrate is subjected to freezing crystallizing in a cold storage for 48 hours at a crystallizing temperature of −5° C. Filtering is performed, and the filter liquor is subjected to vacuum drying at a temperature of 70° C. under the pressure of −0.095 MPa, thereby obtaining 17.7 kg of mogroside composition. Proven by tests, the content of the mogroside IV is 18.9%.

220 kg of rebaudioside A crystallizing mother liquor is subjected to reduced-pressure concentration at a temperature of 80° C. at a degree of vacuum of −0.08 MPa to cleanly volatilize water and solvents from the rebaudioside A crystallizing mother liquor, and baking is performed to obtain 79 kg of stevioside mother liquor saccharides. 474 kg of anhydrous ethyl alcohol is added into the stevioside mother liquor saccharides, heating to a temperature of 60° C. is performed, and stirring is performed for 30 min to fully dissolve the mother liquor saccharides. The ethanol solution is subjected to freezing crystallizing in a cold storage for 48 hours at a crystallizing temperature of −5° C. Filtering is performed, the filter cake is subjected to vacuum drying at a temperature of 70° C. under the pressure of −0.095 MPa, thereby obtaining 42.9 kg of a mixture of steviosides ST, RC and RD, wherein based on the total weight of the composition of the steviosides ST, RC and RD, the weight percent of the stevioside ST is 70.6 wt % in terms of the weight of the stevioside ST.

Natural Compound Sweeteners in Embodiments 1-3

All raw materials (in parts by weight) of the natural compound sweeteners in the embodiments 1-3 are shown in table 1:

TABLE 1

All raw materials (in parts by weight) of the natural compound sweeteners in the embodiments 1-3

| | Raw material | | | | | | | |
|---|---|---|---|---|---|---|---|---|
| | Reference example 1 mogroside V | | Rebaudioside A | | Reference example 2 natural tea theanine | | Dietary fibre | |
| | In parts by weight | Purity | In parts by weight | Purity | In parts by weight | Purity | In parts by weight | Purity |
| Embodiment | 0.6 | 20.6% | 10 | 96.8% | 1 | 15.2% | 80 | 45.2% |
| Embodiment | 6 | 40.1% | 5 | 98.1% | 0.6 | 20.6% | 76 | 50.8% |
| Embodiment | 10 | 50.3% | 1 | 99.0% | 0.2 | 30.0% | 66 | 55.0% |

Note:
the purity of the fructus momordicae dietary fibre in the table is accounted by pectin.

Preparation Method for Natural Compound Sweetener of the Disclosure in the Embodiments 1-3

(1) dissolution, filtration, concentration and sterilization: sufficiently dissolving all the raw materials (in parts by weight) in the embodiments 1-3 according to the table 1 separately with water, of which the weight is 18 times the total mass of all the raw materials in the embodiments 1-3, filtering by a ceramic membrane with a pore size of 0.25 micron, performing concentration at a temperature of 50° C. under a pressure of −0.090 MPa until the solid content is 35%, and finally, performing sterilization at a temperature of 122° C. at a frequency of 50 Hz with UHT (ultrahigh-temperature instant sterilization) to separately obtain sterilized solutions 1-3; and (2) paste-collection, drying and granulation: separately carrying out paste-collection on the sterilized solutions 1-3 obtained in the step (1) until the solid content reaches 60%, finally, performing continuous vacuum drying with a continuous low-temperature vacuum belt drier at a temperature of 35° C. under a pressure of −0.095 MPa until the moisture content is ≤5%, and drying and then granulating the dry powder by a granulator, thereby obtaining the sweetener.

Measuring characteristics of natural compound sweeteners in the embodiments 1-3.

Method I: a 21-person group is employed to perform blind trial tasting, and a result is shown in a table 2.

Wherein, a method for testing sweetness: taking 5% saccharose and 10% saccharose as controls, preparing sweetener solutions, of which the sweetness is equivalent to that of the saccharoses, and calculating ratios of sweeteners to saccharose consumption to evaluate the sweetness of the sweeteners; and a method for testing flavors and odors (sweet feeling and taste): preparing sweetener solutions, of which sweetness is equivalent to that of 1% saccharose, 5% saccharose and 10% saccharose to evaluate the flavors and odors (sweet feeling and taste) of the sweeteners.

TABLE 2

Characteristic taste results of the natural compound sweeteners in the embodiments 1-3

| | Sweetener characteristics | | | |
|---|---|---|---|---|
| Number | Sweetness | Flavor and odor (sweet feeling and taste) | Uniformity and stability | Usage and consumption |
| Embodiment 1 | About 1 times | Very similar to that of saccharose, free of adverse aftertastes of mogroside V and rebaudioside A, and brisk and cool in taste. | Particularly pure in taste, and no layering after 4 h or more of standing | Capable of being used equivalent to saccharose |
| Embodiment 2 | About 6 times | Very similar to that of saccharose, free of adverse aftertastes of mogroside V and rebaudioside A, and brisk and cool in taste. | Particularly pure in taste, and no layering after 4 h or more of standing | Sweetness of package of 1.8 g/bag is equivalent to that of saccharose of 2 spoons (10-12 g). |

TABLE 2-continued

Characteristic taste results of the natural compound sweeteners in the embodiments 1-3

| Number | Sweetener characteristics | | | |
|---|---|---|---|---|
| | Sweetness | Flavor and odor (sweet feeling and taste) | Uniformity and stability | Usage and consumption |
| Embodiment 3 | About 12 times | Very similar to that of saccharose, free of adverse aftertastes of mogroside V and rebaudioside A, and brisk and cool in taste. | Pure in taste, and no layering after 4 h or more of standing | Sweetness of package of 1.8 g/bag is equivalent to that of saccharose of 4 spoons (20-24 g). |

Known from the table 2, the natural compound sweeteners in the embodiments 1-3 are all free of adverse aftertastes of mogroside V and rebaudioside A and are brisk and cool in taste, pure in taste, good in uniformity and stable in properties.

Figure 2:
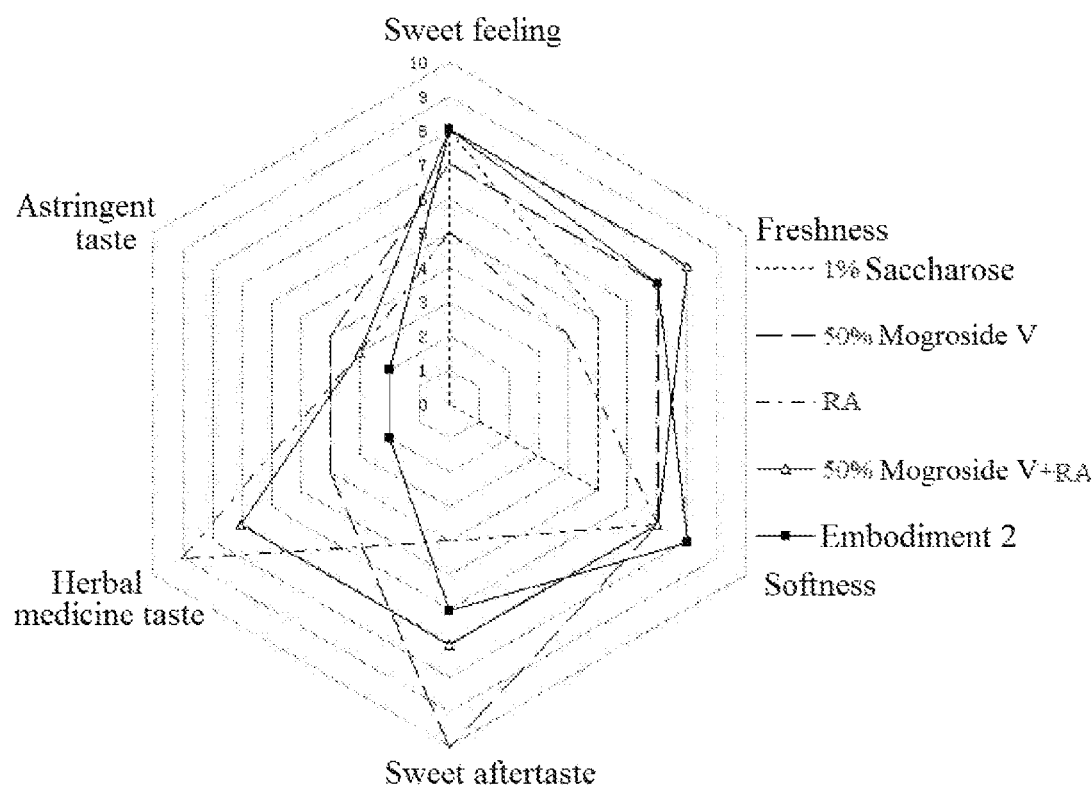
FIG. 2 is an electronic tongue tasting test data graph of a natural compound sweetener of embodiment 2 of the present disclosure.
Figure 3:
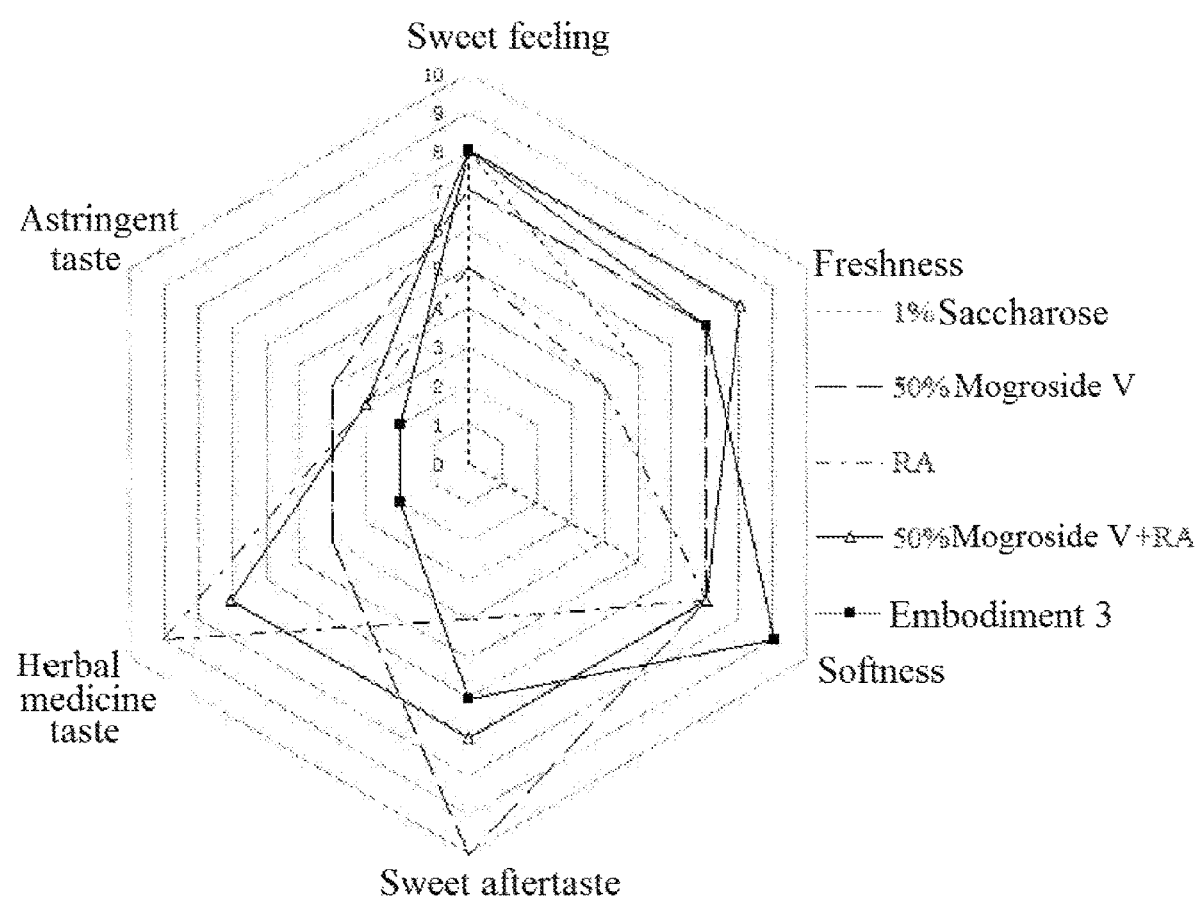
FIG. 3 is an electronic tongue tasting test data graph of a natural compound sweetener of embodiment 3 of the present disclosure.

Method II: an intelligent gustation analysis system TS-5000Z, namely an electronic tongue is adopted to perform tasting, an artificial fat membrane sensor technology, of which an operating principle is similar to that of human tongue gustation cells, is employed, basic gustatory sensory indexes such as bitter taste, astringent taste, sour taste, saline taste, fresh taste, sweet taste and raw material original taste of samples such as foods or drugs can be objectively and digitally evaluated, and meanwhile, a bitter aftertaste, an astringent aftertaste and a fresh aftertaste (abundance) can be further analyzed. Drawing is performed according to test data, and electronic tongue tasting test data graphs of the natural compound sweeteners in the embodiments 1-3 are separately shown in FIG. 1-FIG. 3. Referring to FIG. 1-FIG. 3, by taking 1% (mass concentration) saccharose as a standard, independent rebaudioside A (RA for short) is partial to a herbal medicine taste, namely a raw-material original taste is very strong, and independent 50% mogroside V (50% mogroside V for short) is strong in sweet aftertaste; after the 50% mogroside V and rebaudioside A (50% mogroside V+RA for short) are compounded, both the sweet aftertaste and the herbal medicine taste are not obviously weakened, the taste is free of obvious difference compared with that of independent mogroside V and rebaudioside A, mutual modification cannot be achieved, and thus, the difference from a taste of saccharose is relatively large; and according to the natural compound sweeteners in the embodiments 1-3 of the present disclosure, after compounding, although trace sweet aftertaste and herbal medicine taste are present, the taste has been very close to that of the saccharose.

The invention claimed is:

1. A natural compound sweetener, wherein the compound sweetener comprises raw materials in parts by weight: 0.5-10.0 parts of mogroside V, 1-10 parts of rebaudioside A, 0.1-2.0 parts of natural tea theanine and 60-90 parts of dietary fibre, wherein purity of the mogroside V is 20%-52%; the purity of the rebaudioside A is 95% -99%; the purity of the natural tea theanine is 10%-30%; and the purity of the dietary fibre in terms of pectin is 40%-90%, and wherein the dietary fibre is water-soluble fructus momordicae dietary fibre.

2. The natural compound sweetener according to claim 1, wherein the mogroside V is obtained by a preparation process comprising steps of extraction, membrane separation, decoloring, concentration, sterilization, paste-collection and drying.

3. The natural compound sweetener according to claim 1, wherein the natural tea theanine is obtained by a preparation process comprising steps of tea leaf crushing, room temperature extraction, membrane separation, concentration, sterilization and drying.

* * * * *